(12) United States Patent
Horiguchi

(10) Patent No.: US 11,709,076 B2
(45) Date of Patent: Jul. 25, 2023

(54) ENCODER APPARATUS AND POSITION DETECTION METHOD

(71) Applicant: CANON KABUSHIKI KAISHA, Tokyo (JP)

(72) Inventor: Haruhiko Horiguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/931,604

(22) Filed: Jul. 17, 2020

(65) Prior Publication Data

US 2021/0041846 A1  Feb. 11, 2021

(30) Foreign Application Priority Data

Aug. 8, 2019  (JP) ................. 2019-146511

(51) Int. Cl.
*G01D 5/347* (2006.01)
*G05B 19/35* (2006.01)

(52) U.S. Cl.
CPC ....... *G01D 5/3473* (2013.01); *G01D 5/34794* (2021.05); *G05B 19/351* (2013.01); *G05B 2219/37104* (2013.01); *G05B 2219/37499* (2013.01)

(58) Field of Classification Search
None
See application file for complete search history.

(56) References Cited

U.S. PATENT DOCUMENTS

| 10,514,255 B2 | 12/2019 | Horiguchi | |
|---|---|---|---|
| 2007/0187582 A1* | 8/2007 | Chin | G01D 5/34792 250/231.13 |
| 2010/0241383 A1* | 9/2010 | Teraguchi | G01D 15/00 702/94 |
| 2012/0072169 A1* | 3/2012 | Gribble | G01D 5/24461 702/150 |

(Continued)

FOREIGN PATENT DOCUMENTS

| CN | 107883892 A | 4/2018 |
|---|---|---|
| CN | 108731711 A | 11/2018 |

(Continued)

OTHER PUBLICATIONS

Chinese Office Action dated May 24, 2023 during prosecution of related Chinese Application No. 202010789737.1 (English-language machine translation included).

*Primary Examiner* — Mohammad Ali
*Assistant Examiner* — David Earl Ogg
(74) *Attorney, Agent, or Firm* — Venable LLP

(57) ABSTRACT

An encoder apparatus includes a detection unit, a scale disposed to oppose the detection unit and relatively rotatable with respect to the detection unit, and a processor configured to process an output signal output from the detection unit to obtain a relative position of the scale with respect to a standard position and thus detect an absolute position of the scale. The processor is configured to execute a setting process in which a position where a deviation amount of the scale in a predetermined direction with respect to a rotation axis is equal to or smaller than a threshold value is set as the standard position, the deviation amount changing in accordance with relative rotation of the scale with respect to the detection unit.

12 Claims, 11 Drawing Sheets

(56) References Cited

U.S. PATENT DOCUMENTS

| | | | |
|---|---|---|---|
| 2013/0144553 A1* | 6/2013 | Omata | B25J 13/088 |
| | | | 702/151 |
| 2015/0120055 A1* | 4/2015 | Miyazawa | B25J 9/1697 |
| | | | 700/259 |
| 2016/0018207 A1* | 1/2016 | Fuchs | G01B 5/004 |
| | | | 702/95 |
| 2018/0094924 A1* | 4/2018 | Horiguchi | G01D 5/12 |
| 2019/0178687 A1 | 6/2019 | Horiguchi | |
| 2020/0249055 A1 | 8/2020 | Horiguchi | |

FOREIGN PATENT DOCUMENTS

| | | |
|---|---|---|
| CN | 108801303 A | 11/2018 |
| JP | 2010-112949 | 5/2010 |

\* cited by examiner

INSIDE OF SCALE        OUTSIDE OF SCALE

ENCODER APPARATUS AND POSITION DETECTION METHOD

BACKGROUND OF THE INVENTION

Field of the Invention

The present invention relates to a technique of rotary encoder.

Description of the Related Art

A rotary encoder in which a scale including a pattern is relatively rotated about a rotation axis with respect to a detection unit, the pattern is read by the detection unit, and thus a rotation angle, that is, a rotational position of the scale is obtained is known.

Examples of types of rotary encoders include an incremental type that obtains a relative rotational position, and an absolute type that obtains an absolute rotational position. For an absolute rotary encoder, a measure has to be taken to address an error derived from eccentricity of the scale with respect to the rotation axis, to detect an absolute rotational position, that is, an absolute position, with high precision. As an example of this, Japanese Patent Laid-Open No. 2010-112949 proposes a method of storing a correction value in a memory unit and correcting, by using the correction value stored in the memory unit, a position value obtained when measuring an absolute position.

However, sometimes the absolute position detected by the encoder is shifted and deviated greatly by not changing smoothly in accordance with the rotation of the scale. In such a case, it is difficult to obtain an accurate absolute position even if the position value is corrected by using the correction value.

SUMMARY OF THE INVENTION

According to a first aspect of the present invention, an encoder apparatus includes a detection unit, a scale disposed to oppose the detection unit and relatively rotatable with respect to the detection unit, and a processor configured to process an output signal output from the detection unit to obtain a relative position of the scale with respect to a standard position and thus detect an absolute position of the scale. The processor is configured to execute a setting process in which a position where a deviation amount of the scale in a predetermined direction with respect to a rotation axis is equal to or smaller than a threshold value is set as the standard position, the deviation amount changing in accordance with relative rotation of the scale with respect to the detection unit.

According to a second aspect of the present invention, a position detection method for obtaining an absolute position of a scale that is disposed to oppose a detection unit, is relatively rotatable with respect to the detection unit, and is configured to obtain an output signal output from the detection unit The position detection method includes performing a setting process of setting, as a standard position for detecting the absolute position of the scale, a position where a deviation amount of the scale in a predetermined direction with respect to a rotation axis is equal to or smaller than a threshold value, the deviation amount changing in accordance with relative rotation of the scale with respect to the detection unit, and obtaining the absolute position of the scale by processing the obtained output signal and thus obtaining a relative displacement of the scale with respect to the standard position.

Further features of the present invention will become apparent from the following description of exemplary embodiments with reference to the attached drawings.

DESCRIPTION OF THE EMBODIMENTS

Figure 1:
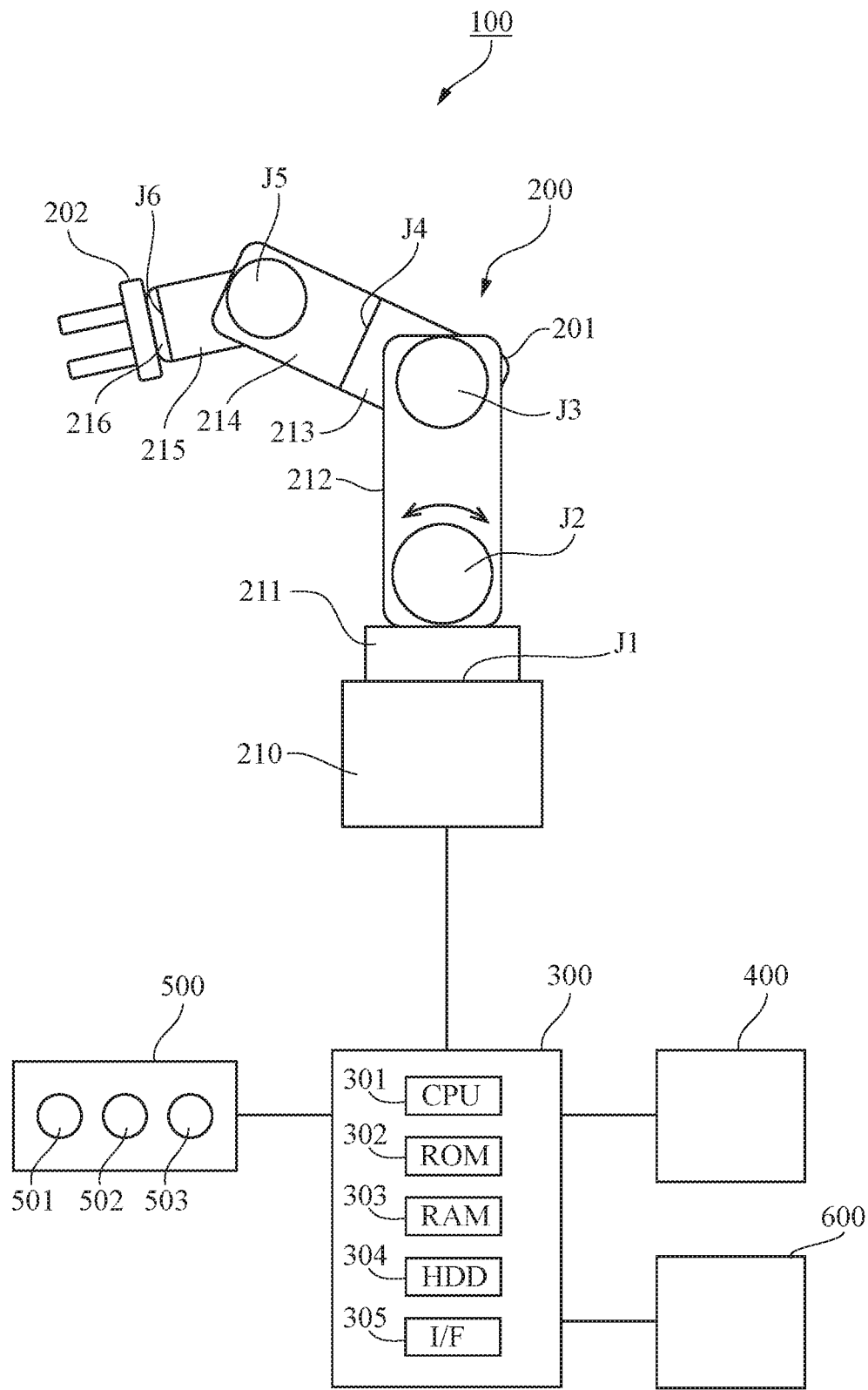
FIG. 1 is an explanatory diagram illustrating a robot apparatus according to an exemplary embodiment.

An exemplary embodiment of the present invention will be described in detail below with reference to drawings. FIG. 1 is an explanatory diagram illustrating a robot apparatus according to the exemplary embodiment. A robot apparatus 100 illustrated in FIG. 1 is an industrial robot, and is provided in a manufacturing line. The robot apparatus 100 is an example of a driving apparatus. The robot apparatus 100 includes a robot body 200 and a control apparatus 300 that serves as an example of a controller and controls the operation of the robot body 200. In addition, the robot apparatus 100 includes a teaching pendant 400, a lamp unit 500, and a display apparatus 600. The teaching pendant 400 is an example of an input portion that an operator operates to input a command or data. Each of the lamp unit 500 and the display apparatus 600 serves as an example of a warning portion that issues a warning.

The robot body 200 includes a robot arm 201 and a robot hand 202 serving as an example of an end effector attached to a distal end of the robot arm 201. The robot body 200 is provided in a manufacturing line, and is used for manufacturing a product.

The robot arm 201 is a vertically articulated robot arm including a plurality of links 210 to 216 that are serially connected to one another. These links 210 to 216 are rotatably interconnected by joints J1 to J6. The link 210 on the proximal end side is a base portion fixed to an unillustrated stand. The robot hand 202 is attached to the link 216 on the distal end side.

Figure 2:
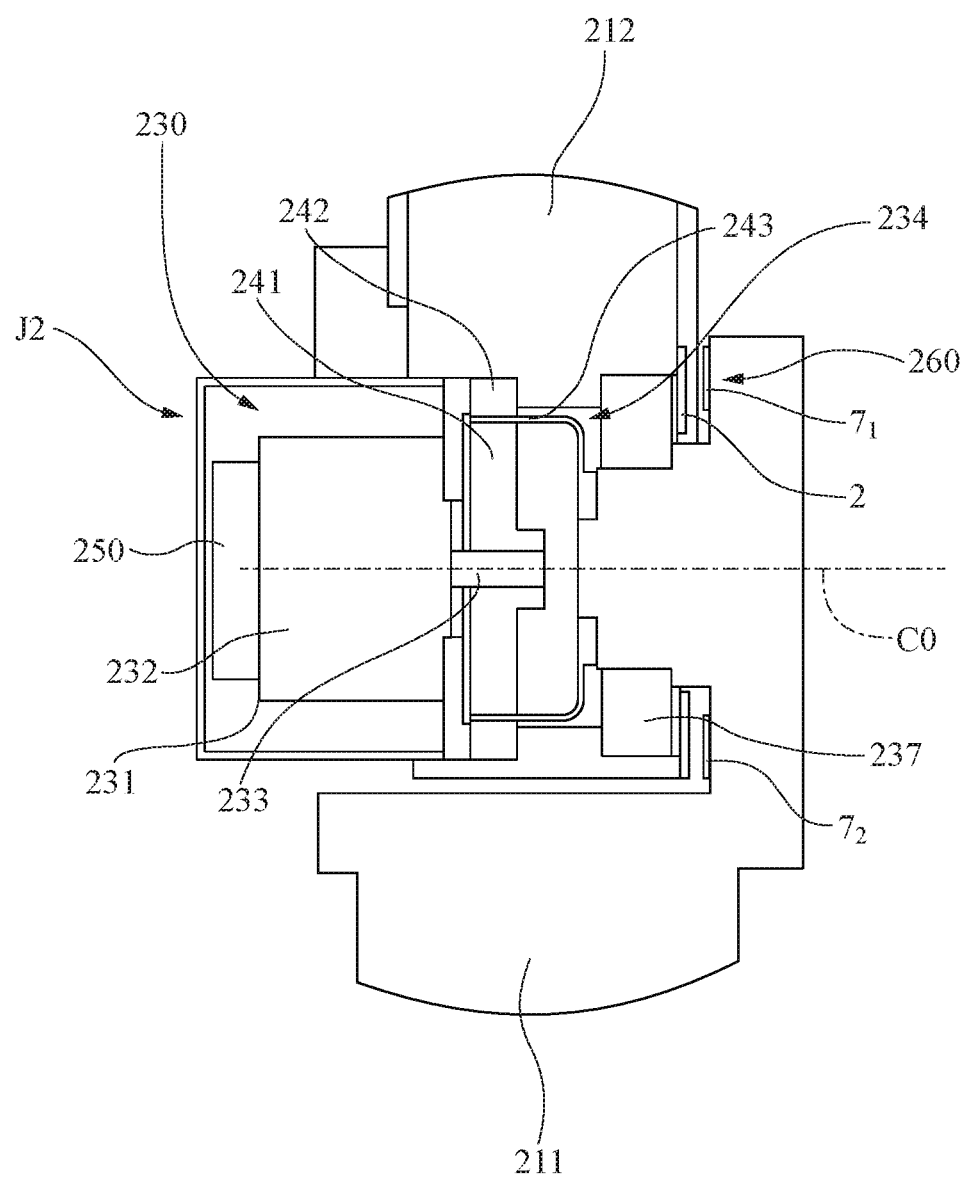
FIG. 2 is a partial section view of a robot arm according to the exemplary embodiment illustrating a joint thereof.

FIG. 2 is a partial section view of the robot arm 201 of the robot apparatus 100 illustrating the joint J2 according to the exemplary embodiment. Hereinafter, the joint J2 will be described as a representative, and since the other joints J1 and J3 to J6 have the same configuration, description of the other joints J1 and J3 to J6 will be omitted.

The links 211 and 212 are rotatably interconnected by a crossed roller bearing 237. Here, the link 211 is an example of a first member and an example of a first link. The link 212 is an example of a second member and an example of a second link. The robot arm 201 includes a driving mechanism 230 that drives the joint J2. That is, the driving mechanism 230 relatively rotationally drives the link 212 with respect to the link 211.

The driving mechanism 230 includes a motor 231 serving as an example of a drive source, and a reduction gear 234 that reduces and outputs the rotation of a rotation shaft of the motor 231. The motor 231 is a servo motor, for example, a brushless direct current servo motor or an alternate current servo motor. The motor 231 includes a housing 232 fixed to the link 212, and an unillustrated stator and an unillustrated rotor accommodated in the housing 232. The unillustrated stator is fixed to the inside of the housing 232. The unillustrated rotor is fixed to a rotation shaft 233.

The reduction gear 234 is a strain wave reduction gear in the present exemplary embodiment. The reduction gear 234 includes a wave generator 241 coupled to the rotation shaft 233 of the motor 231, and a circular spline 242 fixed to the link 212. In addition, the reduction gear 234 includes a flex spline 243 provided between the wave generator 241 and the circular spline 242 and fixed to the link 211. The rotation of the flex spline 243 is reduced at a predetermined reduction ratio with respect to the rotation of the wave generator 241, and the flex spline 243 relatively rotates with respect to the circular spline 242. Therefore, the rotation of the rotation shaft 233 of the motor 231 is reduced by the reduction gear 234 at a predetermined reduction ratio, and the link 212 to which the circular spline 242 is fixed is relatively rotated about a rotation axis C0 with respect to the link 211 to which the flex spline 243 is fixed.

The joint J2 is provided with a rotary encoder 250 for detecting the rotation angle, that is, the rotational position of the rotation shaft 233 of the motor 231. In addition, the joint J2 is also provided with a rotary encoder 260 for detecting the rotation angle, that is, the rotational position of the link 212 with respect to the link 211. The rotary encoder 260 is provided for detecting the angle of the joint J2.

The rotary encoder 260 includes a pair of detection units $7_1$ and $7_2$ disposed in one of the links 211 and 212. In the present exemplary embodiment, the pair of detection units $7_1$ and $7_2$ are disposed on the link 211. The detection unit $7_1$ is a first detection unit. The detection unit $7_2$ is a second detection unit. In addition, the rotary encoder 260 includes a scale 2 disposed on the other of the links 211 and 212 and relatively rotatable with respect to the pair of detection units $7_1$ and $7_2$. In the present exemplary embodiment, the scale 2 is disposed on the link 212. The scale 2 and the pair of detection units $7_1$ and $7_2$ are disposed to oppose each other. The scale 2 is fixed to the link 212 with a fastening member such as a screw in such a manner that the position of the scale 2 with respect to the link 212 can be adjusted. The link 212 rotates with respect to the link 211, and thus the scale 2 relatively rotates about the rotation axis C0 with respect to the pair of detection units $7_1$ and $7_2$. The pair of detection units $7_1$ and $7_2$ are disposed to oppose each other with the rotation axis C0 therebetween, and are fixed to the link 211. To be noted, the scale 2 relatively rotates with respect to the pair of detection units $7_1$ and $7_2$ similarly in the case where the scale 2 is disposed on the link 211 and the pair of detection units $7_1$ and $7_2$ are disposed on the link 212.

In the present exemplary embodiment, the rotary encoders 250 and 260 are absolute rotary encoders for detecting absolute rotational positions, that is, absolute positions. For example, in the case where the reduction ratio of the reduction gear 234 is 50:1, if the link 212 rotates once with respect to the link 211, the rotation shaft 233 of the motor 231 rotates 50 times. Therefore, the rotary encoder 260 needs to detect the absolute position with higher precision than the rotary encoder 250. The information of the absolute position of the rotary encoder 260 can be obtained at a resolution of, for example, 22 [bit] with respect to one rotation of the scale 2, that is, 22 [bit] per 360 [deg.]=$2^{22}$ [LSB]/360 [deg.]=4194304 [LSB]/360 [deg.].

The control apparatus 300 illustrated in FIG. 1 controls the robot arm 201, specifically the driving mechanism 230 of FIG. 2. The control apparatus 300 is constituted by a computer, and includes a central processing unit: CPU 301 as illustrated in FIG. 1. In addition, the control apparatus 300 includes a read-only memory: ROM 302, a random access memory: RAM 303, and a hard disk drive: HDD 304. In addition, the control apparatus 300 includes an interface: I/F 305. The CPU 301 is connected to the ROM 302, the RAM 303, the HDD 304, and the interface 305 via a bus. The interface 305 is connected to the robot body 200, the teaching pendant 400, the lamp unit 500, and the display apparatus 600.

The CPU 301 obtains a signal indicating a rotational position from a processor connected to the rotary encoders 250 and 260 of each of the joints J1 to J6 of the robot arm 201 through the interface 305, and controls the motor 231 of each of the joints J1 to J6 of the robot arm 201. In addition, when the CPU 301 receives an alert signal from the processor of the rotary encoders 250 and 260 of each of the joints J1 to J6 through the interface 305, the CPU 301 controls the lamp unit 500 and the display apparatus 600 on the basis of the obtained alert signal.

The ROM 302 stores a program that causes the CPU 301 to perform basic calculation. The RAM 303 is a storage device that temporarily stores a calculation result of the CPU 301 and the like. The HDD 304 is a storage device that stores a calculation result of the CPU 301, various data obtained from an external apparatus, and the like.

The teaching pendant 400 receives an operation from a user. The lamp unit 500 includes a plurality of lamps that each emit light of a different color. In the present exemplary embodiment, the lamp unit 500 includes three lamps 501, 502, and 503. For example, the lamp 501 emits blue light, the lamp 502 emits yellow light, and the lamp 503 emits red light. On/off of the lamps 501 to 503 is controlled by the CPU 301 of the control apparatus 300.

The display apparatus 600 is an apparatus such as a liquid crystal display that displays an image. The display apparatus 600 displays an image corresponding to image data obtained from the CPU 301 and the control apparatus 300.

Figure 3A:
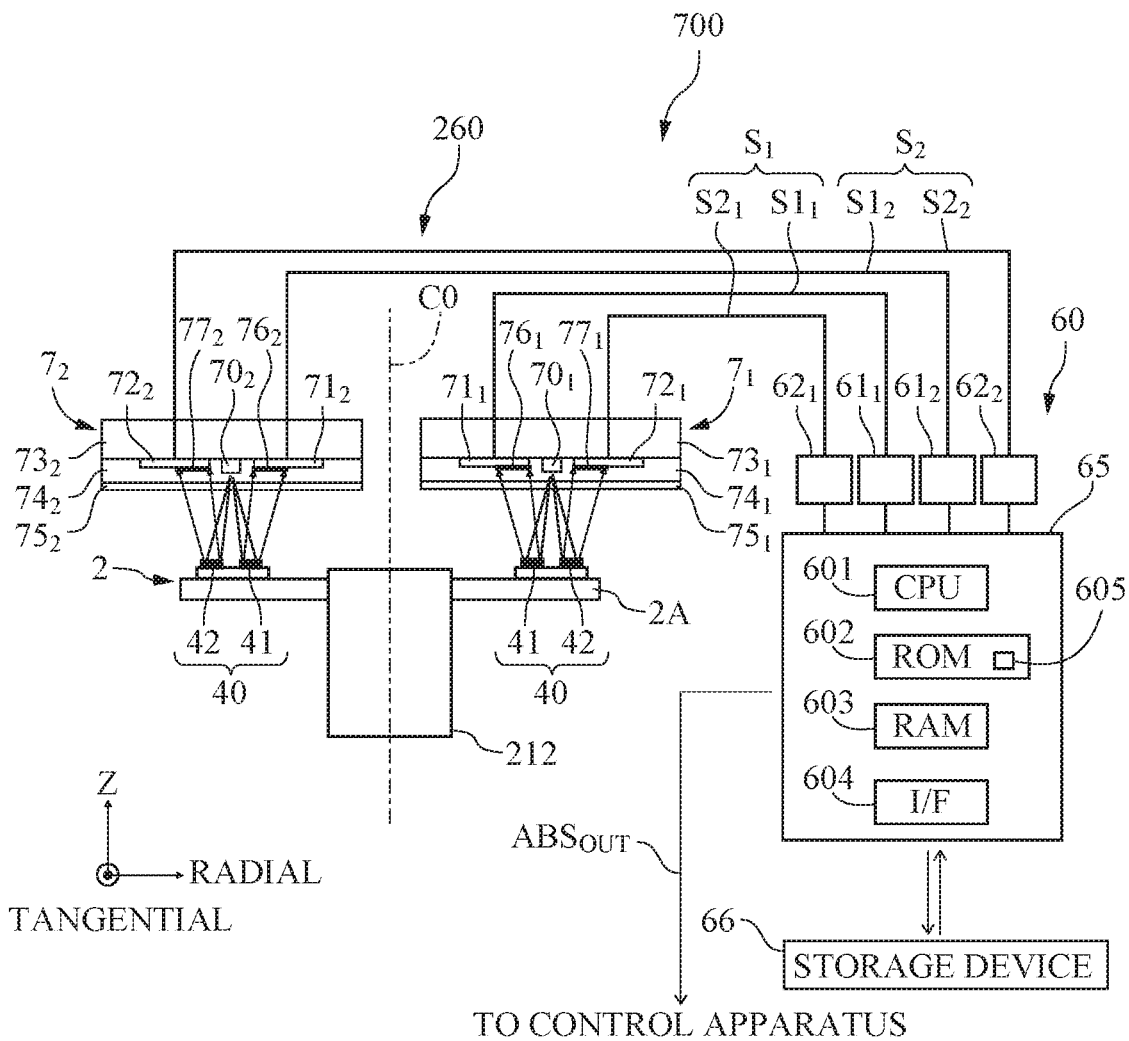
FIG. 3A is an explanatory diagram of an encoder apparatus according to the exemplary embodiment.
Figure 3B:
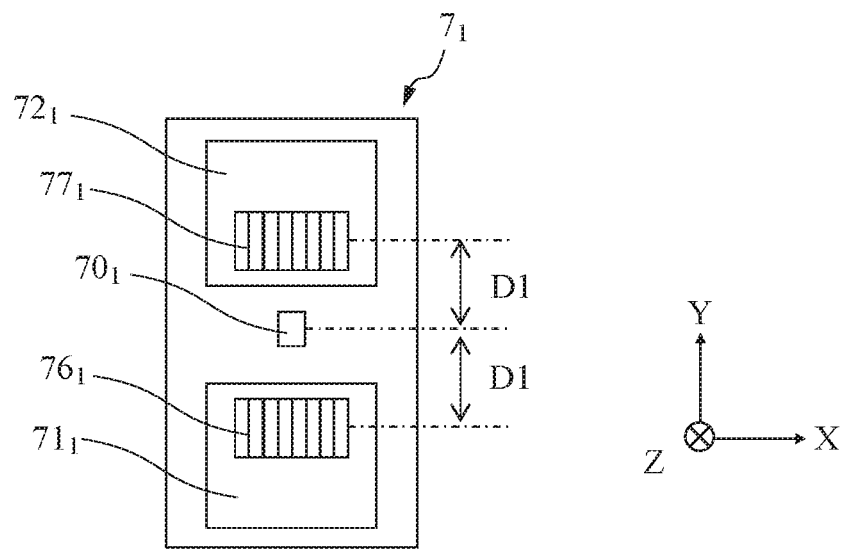
FIG. 3B is a front view of a detection unit of the encoder apparatus according to the exemplary embodiment.

FIG. 3A is an explanatory diagram of an encoder apparatus 700 according to the exemplary embodiment. FIG. 3B is a front view of the detection unit $7_1$ of the encoder apparatus 700 according to the exemplary embodiment. Although a case where the rotary encoder 260 is of an optical type will be described below, the rotary encoder 260 may be of a magnetic type or of an electrostatic capacitance type. In addition, although the rotary encoder 260 is of a light reflection type will be described, the rotary encoder 260 may be of a light transmission type.

The encoder apparatus 700 includes the rotary encoder 260 described above, a processing unit 60 serving as an example of a processor, and a storage device 66. The rotary encoder 260 includes the scale 2 and the pair of detection units $7_1$ and $7_2$ as described above.

The scale 2 includes a substrate 2A and a pattern 40 provided on the substrate 2A. The detection unit $7_1$ is disposed to oppose the pattern 40. The detection unit $7_2$ is disposed to oppose the pattern 40. The detection unit $7_1$ detects the pattern 40, and outputs an output signal $S_1$ serving as an encoder signal corresponding to the detection result to the processing unit 60. The detection unit $7_2$ detects the pattern 40, and outputs an output signal $S_2$ serving as an encoder signal corresponding to the detection result to the processing unit 60. The processing unit 60 processes the output signals $S_1$ and $S_2$ obtained from the rotary encoder 260 to obtain the absolute angle of the scale 2, that is, an absolute position $ABS_{OUT}$, and outputs a result of the processing to the control apparatus 300 illustrated in FIG. 1.

The pair of detection units $7_1$ and $7_2$ are disposed at positions in 180° rotational symmetry with respect to the rotation axis C0. To be noted, although a case where the rotary encoder 260 includes the pair of detection units $7_1$ and $7_2$ will be described as an example below, the configuration is not limited to this. For example, a configuration in which the rotary encoder 260 includes only one detection unit may be employed.

The processing unit 60 includes a processing apparatus 65 including a CPU 601, a ROM 602, a RAM 603, an interface 604, and the like, and processing circuits $61_1$, $62_1$, $61_2$, and $62_2$. The ROM 602 stores a program 605 that causes the CPU 601 to perform various processing. The CPU 601 executes the program 605 to process the output signals $S_1$ and $S_2$ output from the pair of detection units $7_1$ and $7_2$, and thus executes each step of a position detection method for detecting the absolute position $ABS_{OUT}$ of the scale 2. Here, detecting the absolute position $ABS_{OUT}$ has the same meaning as obtaining the absolute position $ABS_{OUT}$.

The ROM 602 is also a non-transitory computer-readable recording medium. Although the program 605 is stored in the ROM 602 in the present exemplary embodiment, the configuration is not limited to this. The program 605 may be stored in any recording medium as long as the recording medium is a computer-readable non-transitory recording medium. For example, as the recording medium for supplying the program 605, a flexible disk, a hard disk, an optical disk, a magneto-photo disk, a magnetic tape, a non-volatile memory, or the like can be used. Examples of the optical disk include a digital versatile disk ROM: DVD-ROM, a compact disk ROM: CD-ROM, and a compact disk-recordable: CD-R. Examples of the non-volatile memory include a universal serial bus memory: USB memory, a memory card, and a ROM.

The processing circuits $61_1$ and $62_1$ are mounted on, for example, a printed board $73_1$, and the processing circuits $61_2$ and $62_2$ are mounted on, for example, a printed board $73_2$. To be noted, the processing unit 60 may be constituted by a dedicated integrated circuit such as an application specific integrated circuit: ASIC or a field-programmable gate array: FPGA. The processing unit performs interpolation of the output signals $S_1$ and $S_2$ serving as read information obtained from the detection units $7_1$ and $7_2$, writing and reading of data into and from the storage device 66, output of the detected absolute position $ABS_{OUT}$, and so forth.

As illustrated in FIGS. 3A and 3B, the detection unit $7_1$ includes a light source $70_1$ constituted by a light-emitting element such as a light-emitting diode: LED, a light-receiving element $71_1$ including a light-receiving element array $76_1$, and a light-receiving element $72_1$ including a light-receiving element array $77_1$. The light source $70_1$ and the light-receiving elements $71_1$ and $72_1$ are mounted on the printed board $73_1$, and sealed by a transparent resin $74_1$. A transparent glass plate $75_1$ is provided on the resin $74_1$. As described above, the detection unit $7_1$ is a package in which a light-receiving element and a light-emitting element are integrated.

The two light-receiving elements $71_1$ and $72_1$ preferably have the same configuration because this has many merits such as allowing using the same parts and reducing the costs. To be noted, the two light-receiving elements $71_1$ and $72_1$ may have different configurations as long as the configurations are appropriate for modulation periods of periodic patterns to be read.

In the present exemplary embodiment, as illustrated in FIG. 3B, a distance between the light emission center of the light source $70_1$ and the light reception center of the light-receiving element array $76_1$ and a distance between the light emission center of the light source $70_1$ and the light reception center of the light-receiving element array $77_1$ are set to the same distance D1. The distance D1 is, for example, 1.75 mm.

As illustrated in FIG. 3A, the detection unit $7_2$ includes a light source $70_2$ constituted by a light-emitting element such as an LED, a light-receiving element $71_2$ including a light-receiving element array $76_2$, and a light-receiving element $72_2$ including a light-receiving element array $77_2$. The light source $70_2$ and the light-receiving elements $71_2$ and $72_2$ are mounted on the printed board $73_2$, and sealed by a transparent resin $74_2$. A transparent glass plate $75_2$ is provided on the resin $74_2$. As described above, the detection unit $7_2$ is a package in which a light-receiving element and a light-emitting element are integrated.

In the present exemplary embodiment, the detection unit $7_2$ has the same configuration as the detection unit $7_1$. By using the same parts as described above, the cost can be reduced.

Figure 4A:
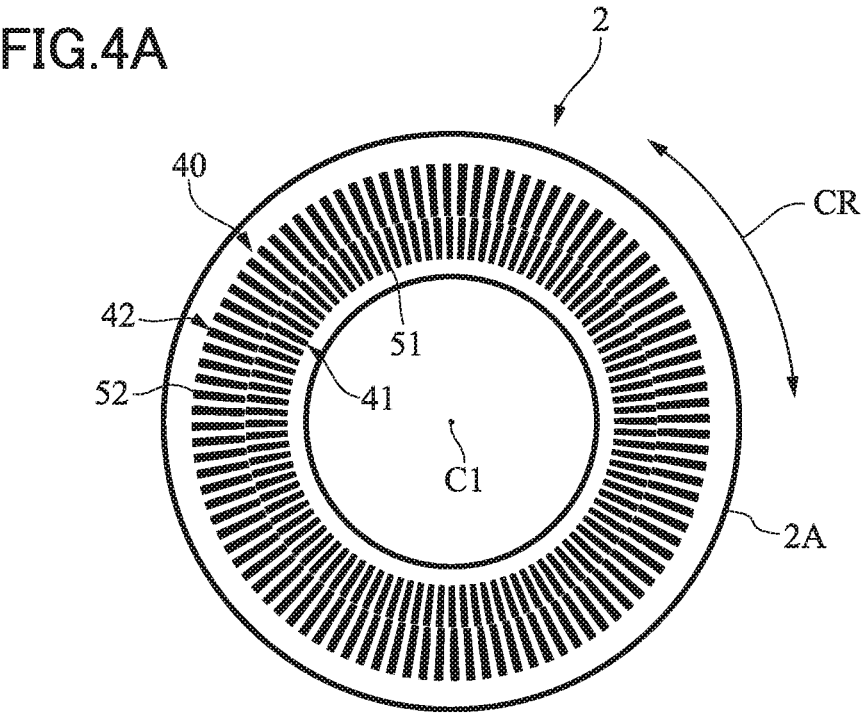
FIG. 4A is a plan view of a scale of the encoder apparatus according to the exemplary embodiment.
Figure 4B:
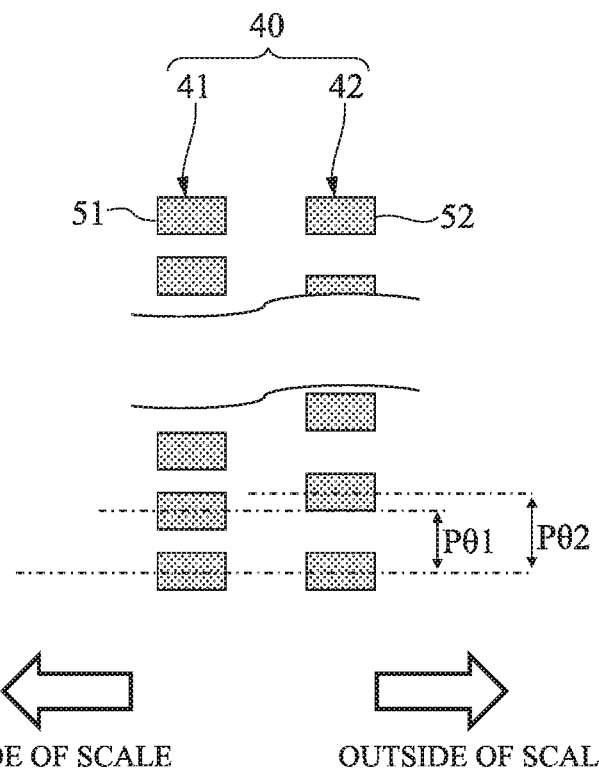
FIG. 4B is a schematic diagram illustrating a pattern of the scale according to the exemplary embodiment.

FIG. 4A is a plan view of the scale 2 of the encoder apparatus according to the exemplary embodiment. FIG. 4B is a schematic diagram illustrating the pattern 40 of the scale 2. As illustrated in FIG. 4A, as viewed in a direction in which a center line C1 extends, that is, as viewed in a direction in which the rotation axis C0 of FIG. 3A extends, the substrate 2A of the scale 2 is formed in a ring shape centered on the center line C1. To be noted, the shape of the substrate 2A is not limited to this, and for example, the substrate 2A may have a disk shape as viewed in the direction in which the rotation axis C0 extends. The pattern 40 to be read by the detection units $7_1$ and $7_2$ is disposed in a ring shape centered on the center line C1 on the substrate 2A as viewed in the direction in which the rotation axis C0 extends.

The pattern 40 includes two periodic patterns 41 and 42 having different periodicity from each other and disposed in concentric circular shapes. The periodic pattern 41 serving as a first periodic pattern includes a plurality of marks 51 serving as a plurality of first pattern elements arranged along a circumferential direction CR about the center line C1. The periodic pattern 42 serving as a second periodic pattern includes a plurality of marks 52 serving as a plurality of second pattern elements arranged along the circumferential direction CR. The periodic pattern 42 is disposed further on the outside than the periodic pattern 41. The number of the marks 52 of the periodic pattern 42 is different from the number of the marks 51 of the periodic pattern 41. The periodic pattern 41 is a scale pattern having a period Pθ1, and the periodic pattern 42 is a scale pattern having a period Pθ2 different from the period Pθ1.

The pair of detection units $7_1$ and $7_2$ are each disposed at such a position as to read both of the periodic patterns 41 and 42. That is, the light-receiving elements $71_1$ and $71_2$ are disposed at positions to read the periodic pattern 41, and the light-receiving elements $72_1$ and $72_2$ are disposed at positions to read the periodic pattern 42.

For example, the substrate 2A is a plate material such as a glass material. The marks 51 and 52 are light reflecting films such as chromium films formed on the substrate 2A. To be noted, the substrate 2A may be formed from a resin such as polycarbonate, or from a metal such as SUS. In addition, the marks 51 and 52 may be films of materials different from chromium, such as aluminum films, as long as the marks 51 and 52 are light reflecting films. The marks 51 and 52 constituting the periodic patterns 41 and 42 are formed to extend radially with respect to the center line C1.

The periods Pθ1 and Pθ2 are slightly different from each other. The CPU 601 of the processing unit 60 performs Vernier calculation of obtaining a Vernier signal having a period different from the original periods Pθ1 and Pθ2 by obtaining a phase difference between signals obtained from reflection light from the marks 51 and 52 having periods Pθ1 and Pθ2, and thus detects the angle. That is, the period of the Vernier signal obtained from the periods Pθ1 and Pθ2 is the least common multiple of the periods Pθ1 and Pθ2. Therefore, the periods Pθ1 and Pθ2 are determined such that a desired Vernier period is obtained. For example, in the case where the period Pθ1 is 360/1650 [deg.] and the period Pθ2 is 360/1649 [deg.], there is a difference of 1 pitch in 360 [deg.].

As illustrated in FIG. 3A, a scattering light beam emitted from the light source $70_1$ of the detection unit $7_1$ disposed to oppose the scale 2 is radiated onto both of the periodic patterns 41 and 42. The light beam reflected on the periodic pattern 41 travels toward the light-receiving element array $76_1$ of the detection unit $7_1$, and the reflectance distribution of the periodic pattern 41 is received by the light-receiving element array $76_1$ as an image. The light beam reflected on the periodic pattern 42 travels toward the light-receiving element array $77_1$ of the detection unit $7_1$, and the reflectance distribution of the periodic pattern 42 is received by the light-receiving element array $77_1$ as an image. The light beam received by the light-receiving element arrays $76_1$ and $77_1$ is converted into electric signals, and detection signals $S1_1$ and $S2_1$ serving as read information of the periodic patterns 41 and 42 corresponding to the rotation angle of the scale 2 are output to the processing circuits $61_1$ and $62_1$ of the processing unit 60.

That is, the output signal $S_1$ output from the detection unit $7_1$ includes the detection signal $S1_1$ serving as a first detection signal corresponding to detection of the periodic pattern 41 and a detection signal $S2_1$ serving as a second detection signal corresponding to detection of the periodic pattern 42.

In the case of the detection unit $7_2$, similarly to the case of the detection unit $7_1$, a scattering light beam emitted from the light source $70_2$ of the detection unit $7_2$ disposed to oppose the scale 2 is radiated onto both of the periodic patterns 41 and 42. The light beam reflected on the periodic pattern 41 travels toward the light-receiving element array $76_2$ of the detection unit $7_2$, and the reflectance distribution of the periodic pattern 41 is received by the light-receiving element array $76_2$ as an image. The light beam reflected on the periodic pattern 42 travels toward the light-receiving element array $77_2$ of the detection unit $7_2$, and the reflectance distribution of the periodic pattern 42 is received by the light-receiving element array $77_2$ as an image. The light beam received by the light-receiving element arrays $76_2$ and $77_2$ is converted into electric signals, and detections signals $S1_2$ and $S2_2$ serving as read information of the periodic patterns 41 and 42 corresponding to the rotation angle of the scale 2 are output to the processing circuits $61_2$ and $62_2$ of the processing unit 60.

That is, the output signal $S_2$ output from the detection unit $7_2$ includes the detection signal $S1_2$ serving as a first detection signal corresponding to detection of the periodic pattern 41 and a detection signal $S2_2$ serving as a second detection signal corresponding to detection of the periodic pattern 42.

Figure 5:
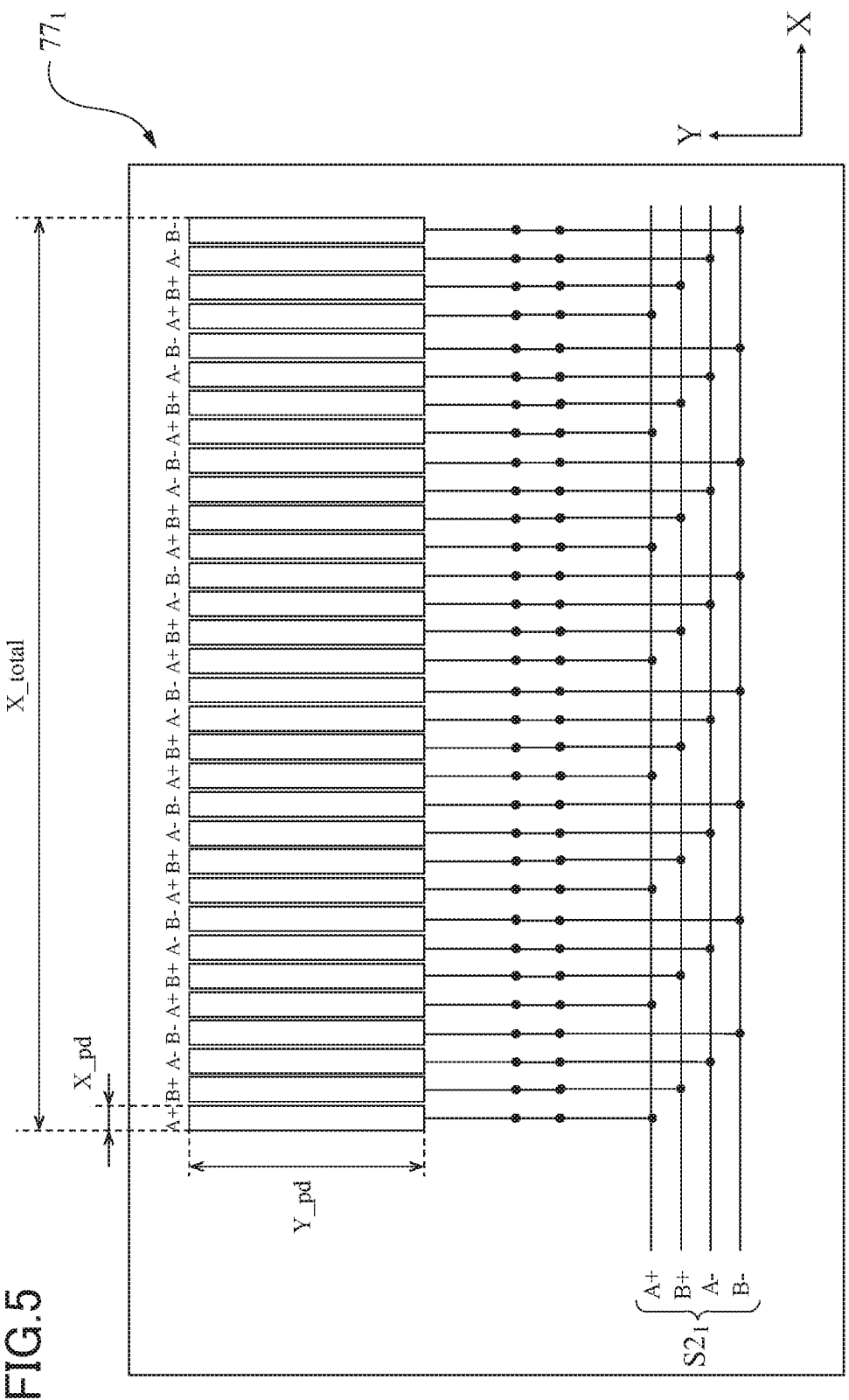
FIG. 5 is a plan view of a light-receiving element array according to the exemplary embodiment.

First, an operation of obtaining the detection signal $S2_1$ serving as phase information of the periodic pattern 42 will be described. FIG. 5 is a plan view of the light-receiving element array $77_1$. To be noted, the light-receiving element arrays $76_1$, $76_2$, and $77_2$ have the same configuration as the light-receiving element array $77_1$, and therefore description thereof will be omitted.

The light-receiving element array $77_1$ illustrated in FIG. 5 includes 32 light-receiving element pieces arranged in an X direction at a pitch of 64 μm. Each light-receiving element piece has a width X_pd of 64 μm in the X direction and a width Y_pd of 800 μm in a Y direction. The total width X_total of the light-receiving element array $77_1$ is 2048 μm.

The light-receiving element array $77_1$ is disposed such that the X direction of the light-receiving element array $77_1$ is approximately parallel to the tangential direction of the scale 2 and the Y direction of the light-receiving element array $77_1$ is approximately parallel to the radial direction of the scale 2. As a result of this, the detection signal $S2_1$ for obtaining the absolute position of the scale 2 is output from the light-receiving element array $77_1$.

The pattern 40 of the scale 2 is projected onto the light-receiving element array $77_1$ as an image doubled in size. Therefore, the detection range by the light-receiving element array $77_1$ is 1024 μm×400 μm on the scale 2. In the case where the reading position on the scale 2 in the radial direction with respect to the center line C1 is set to 33.593 mm when reading the periodic pattern 42 by the light-receiving element array $77_1$, Pθ2 is 128 μm. Therefore, the detection range on the periodic pattern 42 is 8×Pθ2. To be noted, although an example of reading the pattern 40 extending in the radial direction by using the light-receiving element array $77_1$ having a rectangular shape has been described, the light-receiving portion may have a shape extending in the radial direction so as to match the shape of the pattern 40.

Figure 6:
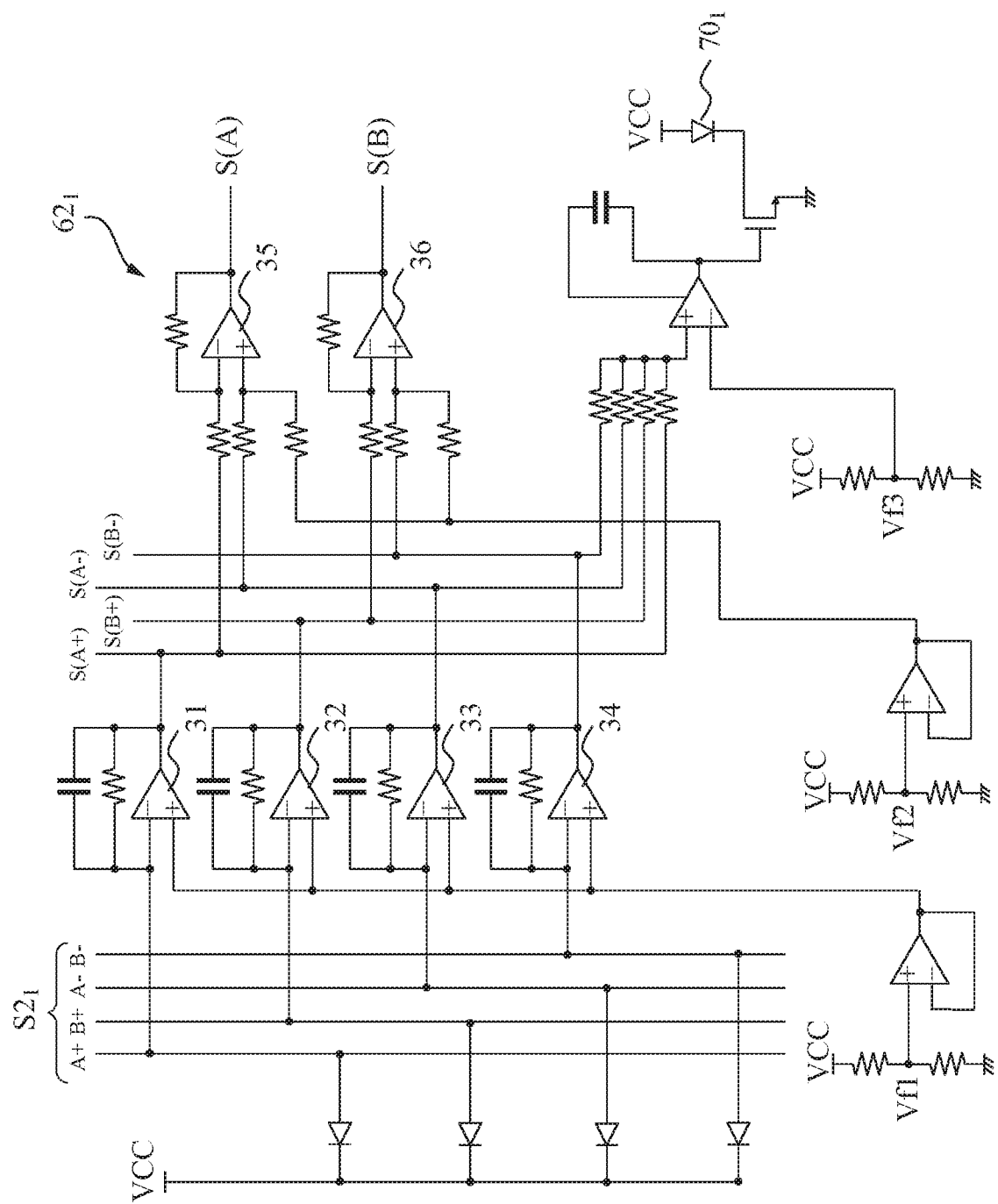
FIG. 6 is a circuit diagram illustrating a processing circuit of a processing unit according to the exemplary embodiment.

FIG. 6 is a circuit diagram illustrating the processing circuit $62_1$ of the processing unit 60. The configuration of the processing circuit $62_1$ and a processing operation of obtaining the phase information of the periodic pattern 42 by the processing circuit $62_1$ will be described. To be noted, the processing circuits $61_1$, $61_2$, and $62_2$ have the same configuration as the processing circuit $62_1$. Here, the detection signal $S2_1$ output from the light-receiving element array $77_1$ includes four signals A+, B+, A−, and B−.

The processing circuit $62_1$ includes four I-V conversion amplifiers 31, 32, 33, and 34 that are first stage amplifiers connected to the output side of the light-receiving element array $77_1$. The four I-V conversion amplifiers 31 to 34 generate four-phase sine wave outputs S(A+), S(B+), S(A−), and S(B−) on the basis of the signals A+, B+, A−, and B− obtained from the light-receiving element array $77_1$. Regarding the relative phases of the four-phase sine wave outputs, when S(A+) is set as the standard, the phase of S(B+) is about +90°, the phase of S(A−) is about +180°, and the phase of S(B−) is about +270°, with respect to the detection pitch.

In addition, the processing circuit $62_1$ includes an A-phase differential amplifier 35 that performs calculation of the following formula (1) on the basis of S(A+) and S(A−) among the four-phase sine wave outputs S(A+), S(B+), S(A−), and S(B−). In addition, the processing circuit $62_1$ includes a B-phase differential amplifier 36 that performs calculation of the following formula (2) on the basis of S(B+) and S(B−) among the four-phase sine wave outputs S(A+), S(B+), S(A−), and S(B−). As a result of calculation of the formulae (1) and (2), two-phase sine wave signals S(A) and S(B) from which direct current components are removed are generated.

$$S(A)=S(A+)-S(A-) \quad (1)$$

$$S(B)=S(B+)-S(B-) \quad (2)$$

Here, it is preferable to correct the gain ratio to prevent superimposition of an error derived from gain variations of the amplifiers 35 and 36 on the two-phase sine wave signals S(A) and S(B). In addition, it is preferable to correct the offset to prevent superimposition of an error derived from offset of the amplifiers 35 and 36 on the two-phase sine wave signals S(A) and S(B). The processing apparatus 65 illustrated in FIG. 3A obtains an amplitude ratio from (maximum value−minimum value)/2 of each of the two-phase sine wave signals S(A) and S(B) in a predetermined region, and performs correction to equalize the amplitude. Similarly, the processing apparatus 65 obtains an offset error amount from (maximum value+minimum value)/2, and corrects the offset. In either case, the processing apparatus 65 stores correction values in the storage device 66, and corrects the two-phase sine wave signals S(A) and S(B) by loading the correction values at the time of position detection.

Further, the processing apparatus 65 obtain a phase signal Φ2, which is a periodic signal, by performing calculation of the following formula (3) by using the two-phase sine wave signals S(A) and S(B) obtained as described above.

$$\Phi2 = A\,TAN\,2[S(A),S(B)] \quad (3)$$

Here, A TAN 2[Y, X] is an arctangent calculation function for determining a quadrant and performing conversion into a phase in a range of 0 to 2π.

Figure 7:
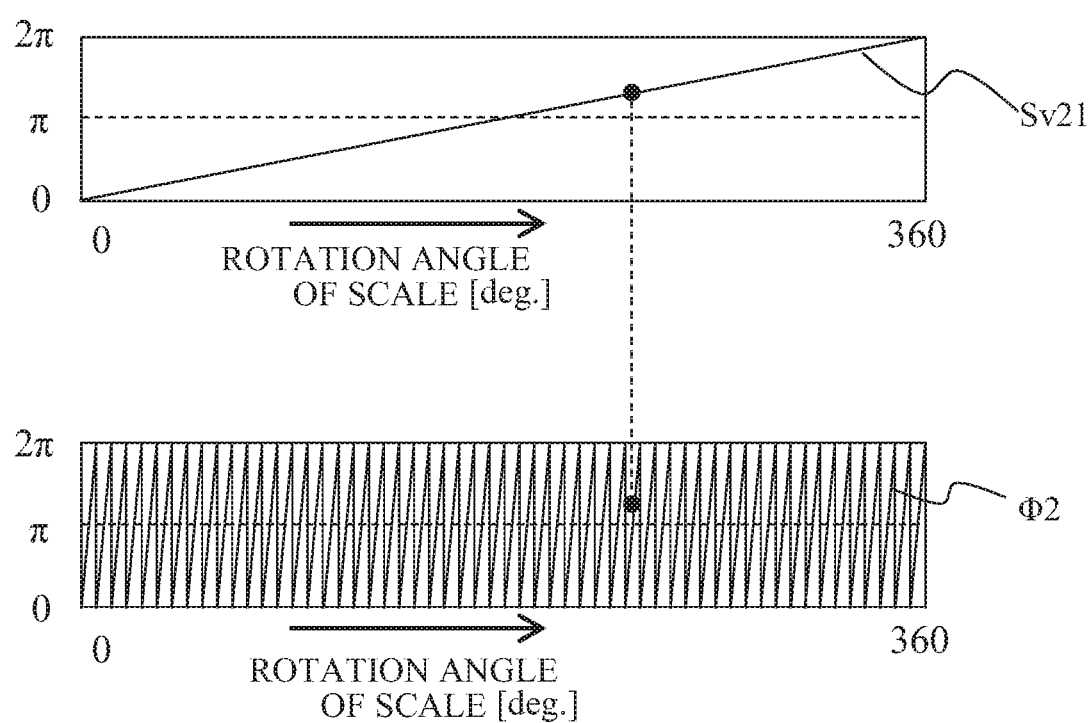
FIG. 7 is a diagram illustrating a Vernier signal and a phase signal according to the exemplary embodiment.

FIG. 7 is a diagram illustrating a relationship between a Vernier signal Sv21, the phase signal Φ2, and the rotation angle of the scale 2. The phase signal Φ2 is a periodic signal having a profile as illustrated in FIG. 7 with respect to the rotation angle of the scale 2. Therefore, the phase signal Φ2 can be used as an incremental signal for detecting the relative displacement of the rotation angle of the scale 2.

Next, a processing operation of obtaining the phase information of the periodic pattern 41 by the processing circuit $61_1$ will be described. The processing circuit $61_1$ has the same circuit arrangement as the processing circuit $62_1$ as described above. As a result of this, the processing circuit $61_1$ generates two-phase sine wave signals S(A)' and S(B)' from read signals obtained from the light-receiving element array $76_1$ of the detection unit $7_1$.

Here, as described above, in the case where the reading position on the scale 2 in the radial direction with respect to the center line C1 is set to 33.593 mm when reading the periodic pattern 42 by the light-receiving element array $77_1$, Pθ2 is 128 μm. In the present exemplary embodiment, the distance D1 between the light emission center of the light source $70_1$ and the light reception center of the light-receiving element arrays $76_1$ and $77_1$ is 1.75 mm. Therefore, the reading position on the scale 2 in the radial direction with respect to the center line C1 when reading the periodic pattern 41 by the light-receiving element array $76_1$ is 31.843 mm. In this case, Pθ1 is 121.3 μm. Therefore, since the detection pitch of the light-receiving element array $76_1$ is 128 μm, a signal obtained from the periodic pattern 41 is deviated from the double of the pattern period on the scale 2. Therefore, it is desirable that the processing apparatus 65 performs processing to correct the relative phase difference between the two-phase sine wave signals S(A)' and S(B)'. A method for correcting the phase difference will be described below.

The two-phase sine wave signals S(A)' and S(B)' including an error e corresponding to the relative phase difference are expressed by the following formulae (4) and (5) where θ represents the phase.

$$S(A)'=\cos(\theta+e/2) \quad (4)$$

$$S(B)'=\sin(\theta-e/2) \quad (5)$$

By calculating the sum of and difference between the two-phase sine wave signals S(A)' and S(B)' according to the formulae (4) and (5), the error e can be separated as expressed by the following formulae (6) and (7).

$$S(A)'+S(B)'=2\times\cos(\theta-\pi/4)\sin(e/2-\pi/4) \quad (6)$$

$$-S(A)'+S(B)'=2\times\sin(\theta-\pi/4)\cos(e/2-\pi/4) \quad (7)$$

The error e can be expressed as e=(1−128/121.3)×π according to a design value. Therefore, the processing apparatus 65 calculates the two-phase sine wave signals S(A) and S(B) expressed by the formulae (8) and (9) in which the error e is eliminated, by multiplying the amplitude components 2×sin(e/2−π/4) and 2×cos(e/2−π/4) by inverse numbers thereof.

$$S(A)=(S(A)'+S(B)')/(2\times\sin(e/2-\pi/4))=\cos\varphi \quad (8)$$

$$S(B)=(-S(A)'+S(B)')/(2\times\cos(e/2-\pi/4))=\sin\varphi \quad (9)$$

To be noted, φ=θ−π/4 holds, and the error e may be stored in the storage device 66 by an initializing operation.

For example, the amplitude component 2×sin(e/2−π/4) is obtained from (maximum value−minimum value)/2 of S(A)=+S(B)' in a predetermined range in the X direction. In addition, the amplitude component 2×cos(e/2−π/4) is obtained from (maximum value−minimum value)/2 of −S(A)'+S(B)'. These amplitude components may be stored in the storage device 66. In this case, effects of the deviation in mounting heights of the light source $70_1$ and the light-receiving element array $77_1$ and effects of the error in the image magnification derived from relative inclination between the scale 2 and the detection unit $7_1$ can be also corrected.

To be noted, to prevent an error derived from gain variations of each amplifier included in the processing circuit $61_1$ from being superimposed on the two-phase sine wave signals S(A) and S(B), it is preferable to correct the gain ratio. In addition, to prevent an error derived from offset of each amplifier included in the processing circuit $61_1$ from being superimposed on the two-phase sine wave signals S(A) and S(B), it is preferable to correct the offset.

The processing apparatus 65 obtains a phase signal $\Phi 1$, which is a periodic signal, by performing calculation of the following formula (10) by using the two-phase sine wave signals S(A) and S(B) obtained as described above.

$$\Phi 1 = A\ \text{TAN}\ 2[S(A), S(B)] \tag{10}$$

The processing apparatus 65 obtains a Vernier signal Sv21 by performing calculation of the following formula (11) by using the phase signals $\Phi 1$ and $\Phi 2$ obtained by using the formulae (3) and (10).

$$Sv21 = \Phi 2 - \Phi 1 \tag{11}$$

Here, the processing apparatus 65 performs calculation of Sv21=Sv21+2π to convert Sv21 into a value within an output range of 0 to 2π when Sv21<0 holds. The relationship between the Vernier signal Sv21 obtained in this manner and the rotation angle of the scale 2 is as illustrated in FIG. 7. Since the rotation angle of the scale 2 corresponding to the Vernier signal Sv21 can be uniquely determined, the rotation angle of the scale 2 can be specified.

The absolute position can be detected also in the case where only the Vernier signal Sv21 obtained as described above is used. However, in the present exemplary embodiment, the processing apparatus 65 performs processing to synchronize the Vernier signal Sv21 with the phase signal $\Phi 2$, and thus generates an absolute position ABS1 with higher precision by using the following formula (12).

$$ABS1 = (\text{ROUND}[((Sv21/(2\pi)) \times (FS/P\theta 2) - \Phi 2) \times (2\pi)] + \Phi 2/(2\pi)) \times P\theta 2\ [\text{deg.}] \tag{12}$$

Here, ROUND[X] is a function of converting X into an integer that is the closest to X. In addition, FS is the total rotation angle in the rotation angle direction, and is 360 [deg.] in the present exemplary embodiment. The value of ABS1 is adjusted to be within a range of 0 to $2^{22}$ by performing calculation of MOD[ABS1, $2^{22}$]. MOD [X, Y] is a function of converting X into a value of remainder obtained by dividing X by Y.

As described above, the processing apparatus 65 obtains the absolute position ABS1 serving as a first position on the basis of the output signal $S_1$ including the detection signals $S1_1$ and $S2_1$ obtained from the detection unit $7_1$.

Figure 8:
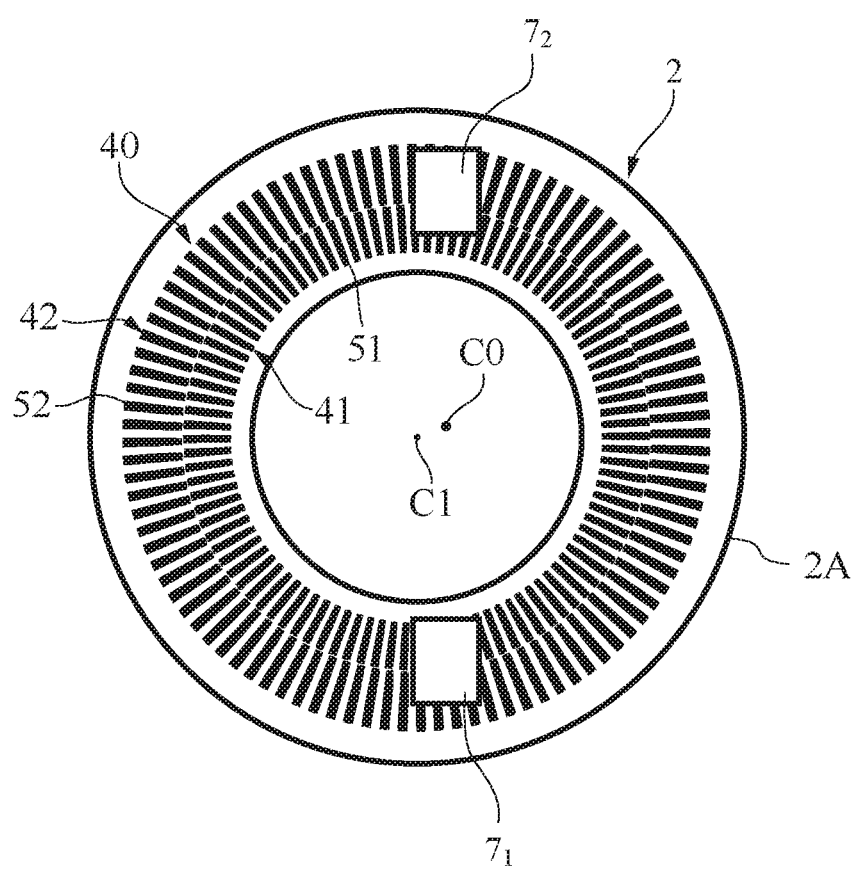
FIG. 8 is an explanatory diagram illustrating a state in which the scale is eccentric in the exemplary embodiment.

Here, the scale 2 is sometimes eccentrically attached to the link 212 with respect to the rotation axis C0, or becomes eccentric with respect to the rotation axis C0 depending on the use conditions or the period in which the scale 2 has been used. FIG. 8 is an explanatory diagram illustrating a state in which the scale 2 is eccentric in the present exemplary embodiment. In the case where the center line C1 of the pattern 40 of the scale 2 is eccentric with respect to the rotation axis C0, an error derived from the eccentricity is superimposed on the obtained absolute position ABS1. In the present exemplary embodiment, the pair of detection units $7_1$ and $7_2$ are used for reducing the eccentricity error superimposed on the absolute position $ABS_{OUT}$ of the scale 2 that is output.

The processing apparatus 65 obtains the two-phase sine wave signals S(A) and S(B) on the basis of the detection signal $S2_2$ obtained from the detection unit $7_2$ similarly to the case of the detection signal $S2_1$ obtained from the detection unit $7_1$, and obtains a phase signal $\Phi 2'$, which is a periodic signal, by using the following formula (13).

$$\Phi 2' = A\ \text{TAN}\ 2[S(A), S(B)] \tag{13}$$

In addition, the processing apparatus 65 obtains the two-phase sine wave signals S(A) and S(B) on the basis of the detection signal $S1_2$ obtained from the detection unit $7_2$ similarly to the case of the detection signal $S1_1$ obtained from the detection unit $7_1$, and obtains a phase signal $\Phi 1'$, which is a periodic signal, by using the following formula (14).

$$\Phi 1' = A\ \text{TAN}\ 2[S(A), S(B)] \tag{14}$$

Further, the processing apparatus 65 obtains a Vernier signal Sv21' by calculation using the following formula (15) obtained from the formulae (13) and (14).

$$Sv21' = \Phi 2' - \Phi 1' \tag{15}$$

Here, the processing apparatus 65 performs calculation of Sv21'=Sv21'+2π to convert Sv21' into a value within an output range of 0 to 2π when Sv 21'<0 holds. The absolute angle can be detected also in the case where only the Vernier signal Sv21' obtained as described above is used. However, in the present exemplary embodiment, the processing apparatus 65 performs processing to synchronize the Vernier signal Sv21' with the phase signal $\Phi 2'$, and thus generates an absolute position ABS2 with higher precision by using the following formula (16).

$$ABS2 = (\text{ROUND}[(Sv21'/(2\pi)) \times (FS/P\theta 2) - \Phi 2') \times (2\pi)] + \Phi 2'/(2\pi)) \times P\theta 2\ [\text{deg.}] \tag{16}$$

The value of the absolute position ABS2 is adjusted to be within a range of 0 to $2^{22}$ by performing calculation of MOD[ABS2, $2^{22}$].

As described above, the processing apparatus 65 obtains the absolute position ABS2 serving as a second position on the basis of the output signal $S_2$ including the detection signals $S1_2$ and $S2_2$ obtained from the detection unit $7_2$.

Figure 9A:
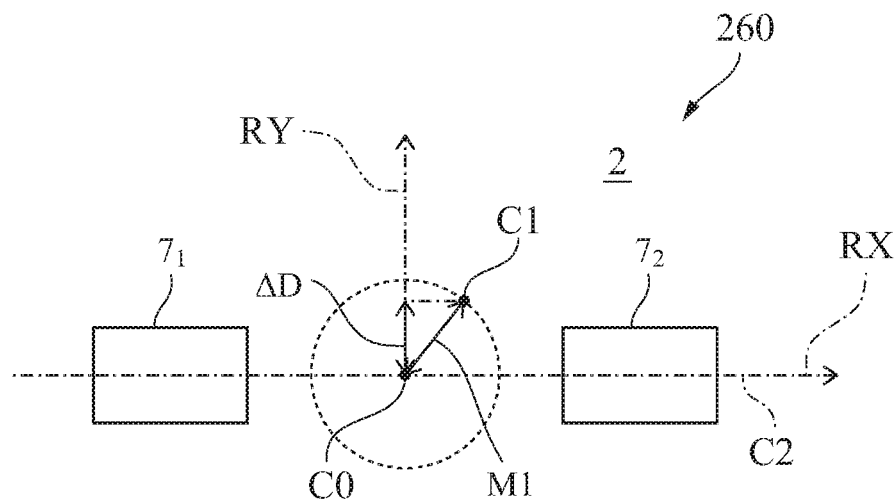
FIG. 9A is an explanatory diagram of a rotary encoder according to the exemplary embodiment.

FIG. 9A is an explanatory diagram of the rotary encoder 260 as viewed in the direction of the rotation axis C0 when the scale 2 eccentric with respect to the detection units $7_1$ and $7_2$ rotates. In the case where the center line C1 of the scale 2 is eccentric with respect to the rotation axis C0, the center line C1 of the scale 2, that is, of the pattern 40, revolves around the rotation axis C0 as indicated by a broken line in FIG. 9A in accordance with rotation of the scale 2 around the rotation axis C0. The magnitude of an eccentricity amount M1 of the center line C1 with respect to the rotation axis C0 hardly changes in accordance with the rotation of the scale 2. The eccentricity direction of the center line C1 with respect to the rotation axis C0 changes in accordance with the rotation of the scale 2.

Here, as viewed in the direction of the rotation axis C0, a deviation amount of the center line C1 with respect to the rotation axis C0 in an RY direction perpendicular to a straight line C2 passing through the center of each of the pair of detection units $7_1$ and $7_2$ and the rotation axis C0 is denoted by ΔD. The RY direction serves as a predetermined direction, and is one of radial directions extending from the rotation axis C0. The deviation amount ΔD is generated due to the eccentricity of the center line C1 of the scale 2 with respect to the rotation axis C0. In addition, the magnitude of the deviation amount ΔD changes in accordance with the rotation of the scale 2.

The deviation amount ΔD in the RY direction serves as an eccentricity error in the absolute positions ABS1 and ABS2 calculated by using the detection units $7_1$ and $7_2$. That is, the eccentricity error superimposed on the absolute positions ABS1 and ABS2 is larger when the deviation amount ΔD is larger. To be noted, in the case where the center line C1 is deviated with respect to the rotation axis C0 in an RX direction in which the straight line C2 extends, the positions of the marks 51 and 52 of the pattern 40 read by the detection units $7_1$ and $7_2$ are approximately the same as in the case where the center line C1 is not deviated with respect to the rotation axis C0. Therefore, the eccentricity error superimposed on the absolute positions ABS1 and ABS2 is remarkably small in this case.

In the present exemplary embodiment, the detection units $7_1$ and $7_2$ are disposed at positions in 180° rotation symmetry with respect to the rotation axis C0. Therefore, the following relationship expressed by the formula (17) is established.

$$ABS1=ABS2+180 \text{ [deg.]} \tag{17}$$

In addition, since the detection units $7_1$ and $7_2$ are disposed at positions in 180° rotation symmetry with respect to the rotation axis C0, the eccentricity error superimposed on the absolute position ABS1 and the eccentricity error superimposed on the absolute position ABS2 are opposite to each other in terms of positivity and negativity.

Therefore, in the present exemplary embodiment, the processing unit 60 obtains an average value of the absolute positions ABS1 and ABS2 to obtain an absolute position ABS in which the eccentricity error is eliminated. Specifically, the processing unit 60 performs calculation expressed by the following formula (18) to obtain the absolute position ABS by using the absolute positions ABS1 and ABS2.

$$ABS=(ABS1+ABS2)/2 \tag{18}$$

The value of the absolute position ABS is adjusted to be within a range of 0 to $2^{22}$ by performing calculation of MOD[ABS, $2^{22}$]. As a result of the calculation described above, the error derived from the eccentricity of the scale 2 in the absolute position ABS is reduced.

Figure 9B:
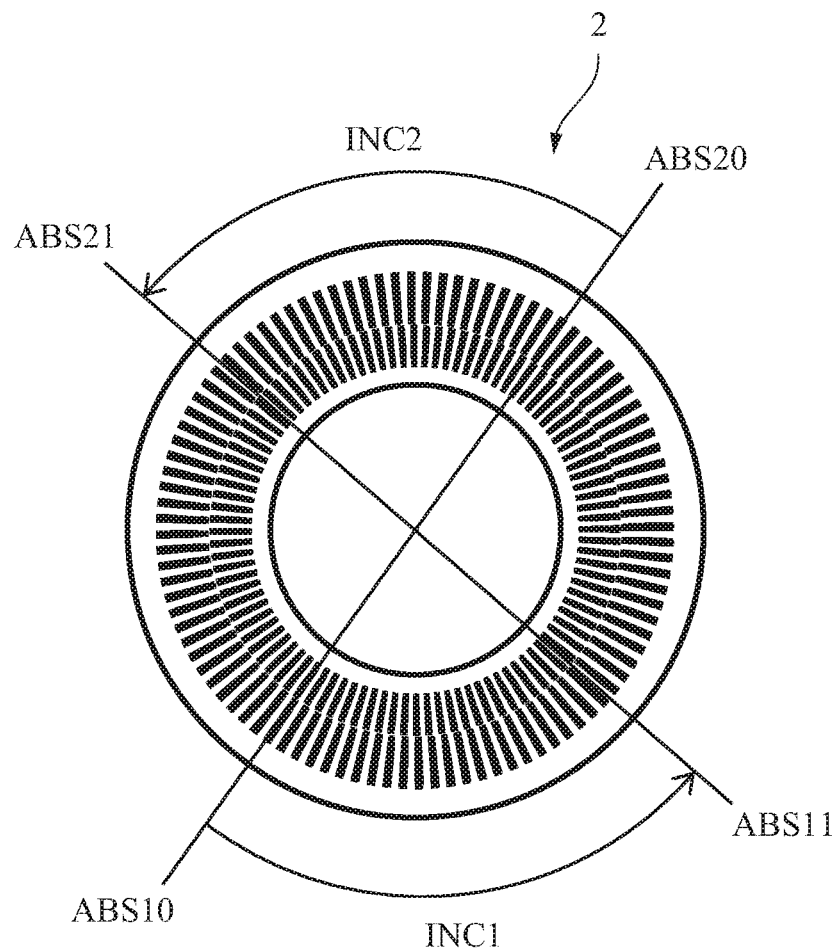
FIG. 9B is a diagram for describing processing of obtaining an absolute position in the exemplary embodiment.

Although the processing unit 60 may obtain the information of the absolute position to be output to the control apparatus 300 by the method described above each time the processing unit 60 outputs the information of the absolute position, in the present exemplary embodiment, the processing unit 60 obtains the information of the absolute position by a different method. FIG. 9B is a diagram for describing a process for obtaining the absolute position in the exemplary embodiment.

The description will be given first focusing on the detection unit $7_1$. In the present exemplary embodiment, the processing unit 60 calculates the absolute position ABS1 on the basis of the output signal $S_1$ obtained at a predetermined timing, and this absolute position ABS1 is set as a standard position ABS10. This standard position ABS10 is a standard position for detecting the absolute position of the scale 2. The predetermined timing is, for example, a timing at which the power of the robot apparatus 100 is turned on, or a timing at which a resetting operation is performed by an operator. After this timing, the processing unit 60 obtains an absolute position ABS11 of the scale 2 from a relative displacement INC1 of the scale 2 with respect to the standard position ABS10.

Similarly in the case of the detection unit $7_2$, the processing unit 60 calculates the absolute position ABS2 on the basis of the output signal $S_2$ obtained at a predetermined timing, and this absolute position ABS2 is set as a standard position ABS20. This standard position ABS20 is a standard position for detecting the absolute position of the scale 2. After this timing, the processing unit 60 obtains an absolute position ABS21 of the scale 2 from a relative displacement INC2 of the scale 2 with respect to the standard position ABS20.

The processing unit 60 performs the same calculation as the formula (18) to obtain the absolute position of the scale 2 serving as a detection result. This absolute position is set as the absolute position $ABS_{OUT}$. The processing unit 60 outputs information of the absolute position $ABS_{OUT}$ to the control apparatus 300 as a detection result. As a result of the processing unit 60 detecting, that is, calculating the absolute position $ABS_{OUT}$ by the method described above, the time for calculation can be shortened, and thus acceleration of control of the robot arm 201 can be realized.

Figure 10A:
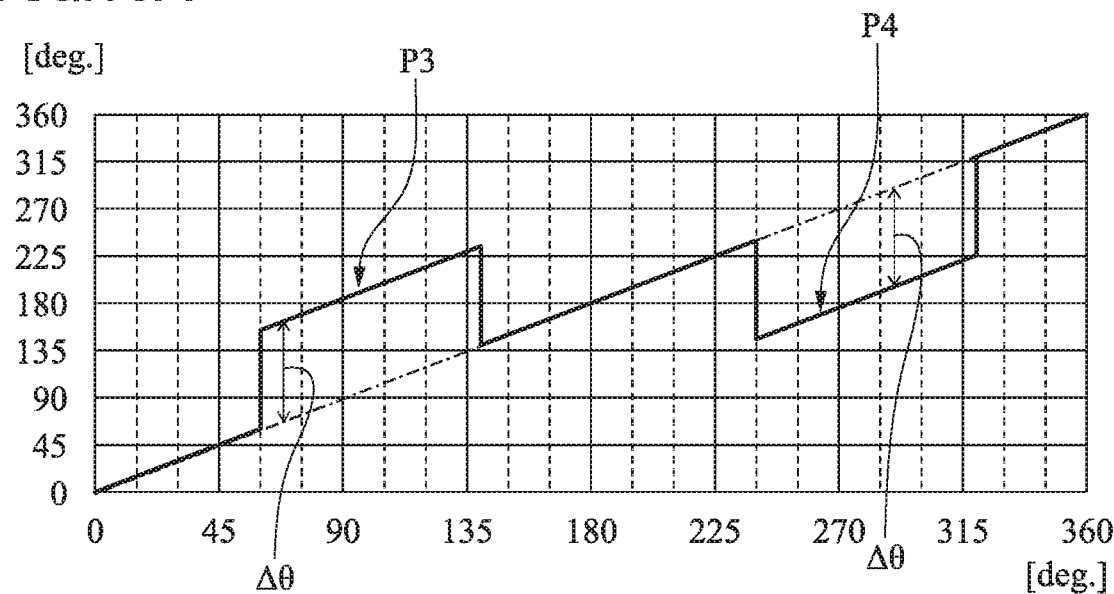
FIG. 10A is a graph of absolute position according to the exemplary embodiment.

Incidentally, in the case where the eccentricity amount M1 of the scale 2 is out of an allowable range, sometimes the obtained absolute positions ABS1 and ABS2 are greatly shifted from actual positions even if the absolute positions ABS1 and ABS2 are obtained by using the pair of detection units $7_1$ and $7_2$. FIG. 10A is a graph illustrating a relationship between the actual position and the absolute position ABS1 obtained by calculation. In FIG. 10A, a one-dot chain line indicates a case where the eccentricity amount M1 of the scale 2 is within the allowable range, and a solid line indicates a case where the eccentricity amount M1 of the scale 2 is out of the allowable range. As illustrated in FIG. 10A, the absolute position ABS1 of the case where the eccentricity amount M1 of the scale 2 is out of the allowable range sometimes shifts in an increasing or decreasing direction by a deviation Δθ from the absolute position ABS1 of the case where the eccentricity amount M1 of the scale 2 within the allowable range. If the standard position ABS10 is set in a state in which the deviation Δθ has been generated, the value of the detected absolute position ABS11 will be shifted by the deviation Δθ after this. The same applies to the absolute position ABS21.

Figure 11A:
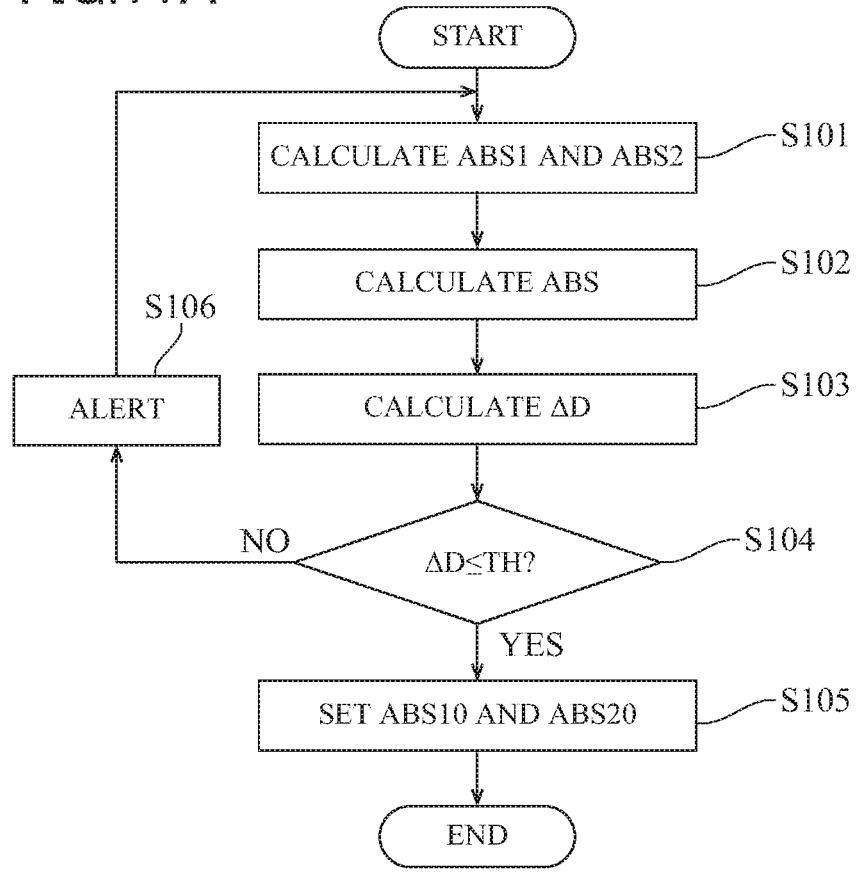
FIG. 11A is a flowchart of processing for detecting an absolute position in the exemplary embodiment.
Figure 11B:
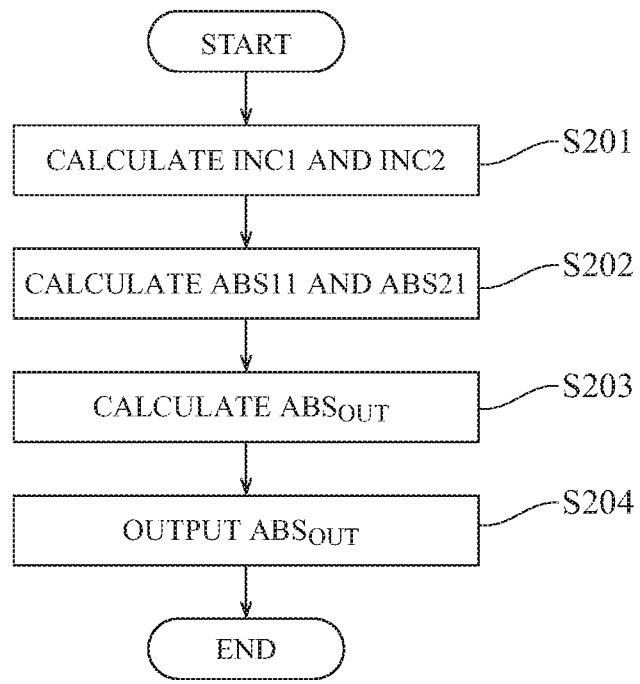
FIG. 11B is a flowchart of processing of detecting an absolute position in the exemplary embodiment.

FIGS. 11A and 11B is a flowchart of detection of the absolute position $ABS_{OUT}$. FIG. 11A is a flowchart illustrating setting processing for performing initial settings for detecting the absolute position $ABS_{OUT}$ of the scale 2, that is, for setting the standard position. First, processing of FIG. 11A will be described in detail.

In step S101, the processing unit 60 calculates the absolute positions ABS1 and ABS2 on the basis of the output signals $S_1$ and $S_2$ obtained from the pair of detection units $7_1$ and $7_2$ at a predetermined timing. Next, in step S102, the processing unit 60 calculates the absolute position ABS by using the formula (18) described above.

Next, in step S103, the processing unit 60 calculates the deviation amount ΔD on the basis of the absolute position ABS1 or ABS2 and the absolute position ABS. Here, the deviation amount ΔD is the magnitude of an eccentricity component in the RY direction included in the eccentricity amount, and is 0 or a positive value. Although the deviation amount ΔD may be measured by using a laser displacement sensor or the like that is additionally provided, in the present exemplary embodiment, the absolute position ABS1 or ABS2 and the absolute position ABS are used. For example, the processing unit 60 calculates the difference between the absolute position ABS1 or ABS2 and the absolute position ABS as the deviation amount ΔD. To be noted, the method for calculating the deviation amount ΔD is not limited to this. As described above, the processing unit 60 obtains the deviation amount ΔD on the basis of the output signals $S_1$ and $S_2$ obtained from the pair of detection units $7_1$ and $7_2$ at a predetermined timing.

In step S104, the processing unit 60 determines whether or not the deviation amount ΔD is equal to or smaller than a threshold value TH. The threshold value TH also serves as an allowable limit of the eccentricity amount M1. The threshold value TH is a positive value similarly to the deviation amount ΔD, and is set in the storage device 66 in advance.

Figure 10B:
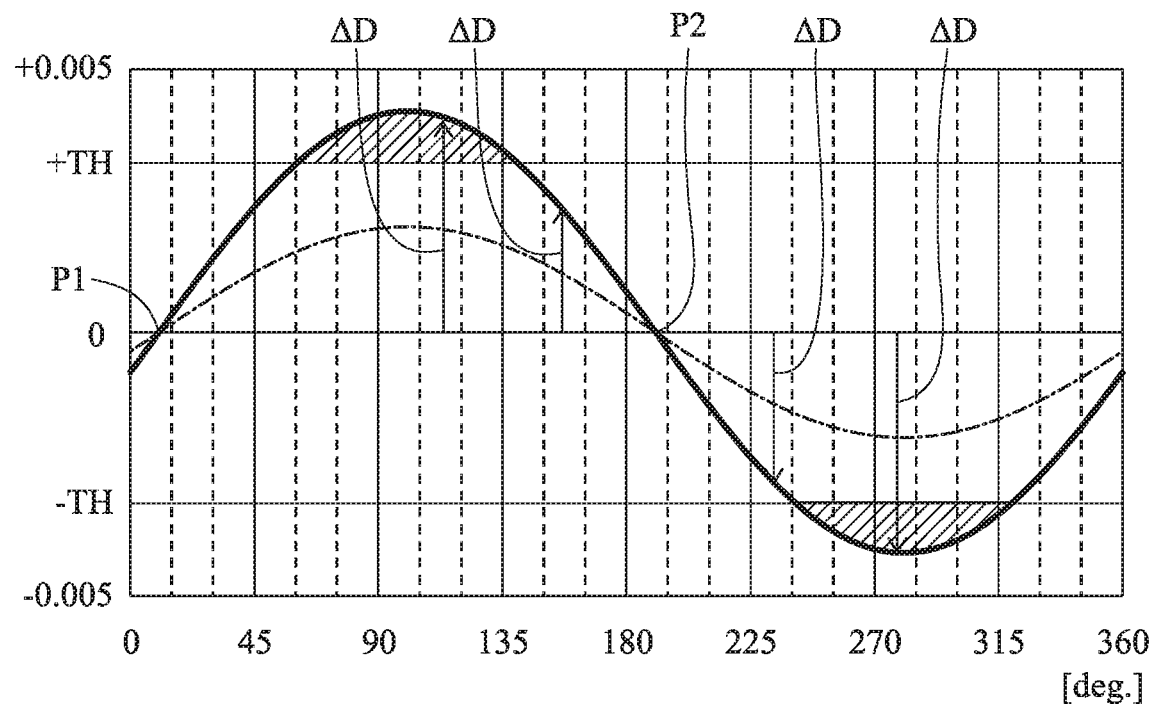
FIG. 10B is a graph illustrating a profile of deviation amount versus the rotation angle of the scale according to the exemplary embodiment.

FIG. 10B is a graph illustrating a profile of the deviation amount ΔD with respect to the rotation angle of the scale 2. As illustrated in FIG. 10B, the deviation amount ΔD changes in a sine wave shape with respect to the rotation angle, that is, the rotational position of the scale 2. The maximum amplitude of the sine wave serves as the eccentricity amount M1 of the scale 2. The maximum amplitude of the sine wave is larger when the eccentricity amount M1 is larger.

The profile is a sine wave of a one-dot chain line in FIG. 10B in the case where the eccentricity amount M1 of the scale 2 is equal to or smaller than the threshold value TH, and the profile is a sine wave of a solid line in FIG. 10B in the case where the eccentricity amount M1 of the scale 2 is larger than the threshold value TH.

In the case where the deviation amount ΔD is equal to or smaller than the threshold value TH, that is, in the case where the result of step S104 is YES, the processing unit 60 sets the standard positions ABS10 and ABS20 in step S105. That is, the processing unit 60 sets data of the absolute positions ABS1 and ABS2 obtained in step S101 in the storage device 66 as data of the standard positions ABS10 and ABS20.

In the case where the deviation amount ΔD draws the sine wave indicated by a one-dot chain in FIG. 10B, the deviation amount D is equal to or smaller than the threshold value TH at any rotational position of the scale 2 within the range of 0 [deg.] or larger and smaller than 360 [deg.]. Therefore, in this case, the error of the absolute positions ABS1 and ABS2 obtained on the basis of the output signals $S_1$ and $S_2$ obtained at a predetermined timing is equal to or smaller than about 20 [arcsecond], which indicates high precision. Therefore, the obtained absolute positions ABS1 and ABS2 may be set as the standard positions ABS10 and ABS20.

In the case where the deviation amount ΔD draws the sine wave indicated by a solid line in FIG. 10B, a section where the deviation amount ΔD exceeds the threshold value TH and a section where the deviation amount ΔD does not exceed the threshold value TH are both present in one rotation of the scale 2. In the section where the deviation amount ΔD does not exceed the threshold value TH, for example, absolute positions P1 and P2 where the deviation amount ΔD is 0 in FIG. 10B are included. The deviation amount ΔD exceeds the threshold value TH at positions ±90 [deg.] from the absolute positions P1 and P2. If the positions where the deviation amount ΔD exceeds the threshold value TH are set as standard positions, absolute positions on which a large deviation Δθ as illustrated in FIG. 10A is superimposed are output. This deviation Δθ is caused by failure in synchronization of phases of the Vernier signal and a lower signal Sections indicated by hatching in FIG. 10B correspond to sections P3 and P4 illustrated in FIG. 10A. The deviation Δθ in the sections P3 and P4 is, for example, several minutes to several tens of degrees, which are much larger than the eccentricity error.

In the present exemplary embodiment, in the case where the deviation amount ΔD is larger than the threshold value TH, that is, in the case where the result of step S104 is NO, the processing unit 60 outputs an alert signal to the control apparatus 300 in step S106, and returns to the processing of step S101. The scale 2 is rotated until the deviation amount ΔD becomes equal to or smaller than the threshold value TH, and steps S101 to S106 are repeated. As a result of this, in the case where the scale 2 has rotated to a position where the deviation amount ΔD is larger than the threshold value TH, the processing unit 60 stands by until the scale 2 rotates to a position where the deviation amount ΔD is equal to or smaller than the threshold value TH.

When the control apparatus receives input of an alert signal, the control apparatus 300 issues warning to the operator by, for example, turning on the lamp 503 of the lamp unit 500, or displaying an alert image on the display apparatus 600. The operator operates the teaching pendant 400 in response to the warning. The control apparatus 300 operates the robot body 200 in accordance with the operation of the teaching pendant 400 by the operator, and thus rotates the scale 2. To be noted, the control apparatus 300 may automatically operate the robot body 200 to rotate the scale 2 when receiving the input of the alert signal. That is, in the case where the deviation amount ΔD is larger than the threshold value TH when the processing unit 60 is performing a setting process, the control apparatus 300 controls the driving mechanism 230 to relatively rotate the link 212 with respect to the link 211 such that the deviation amount ΔD becomes equal to or smaller than the threshold value TH.

When the deviation amount ΔD becomes equal to or smaller than the threshold value TH as a result of the rotation of the scale 2, the processing unit 60 sets, as the absolute positions ABS10 and ABS20, the absolute positions ABS1 and ABS2 at the time when the scale 2 is at a position where the deviation amount ΔD is equal to or smaller than the threshold value TH. As described above, the standard positions ABS10 and ABS20 of high precision can be set.

Next, after setting the standard positions ABS10 and ABS20 by the setting process illustrated in FIG. 11A, the processing unit 60 obtains the absolute position $ABS_{OUT}$ of the scale 2, which is a detection value to be output to the control apparatus 300, in accordance with the flowchart illustrated in FIG. 11B.

Specifically, in step S201, the processing unit 60 obtains relative displacements INC1 and INC2 of the scale 2 with respect to the standard positions ABS10 and ABS20 by processing the obtained output signals $S_1$ and $S_2$. The relative displacement INC1 is obtained by counting the phase signal Φ1 or the phase signal Φ2. The relative displacement INC2 is obtained by counting the phase signal Φ1' or the phase signal Φ2'. To be noted, the relative displacement INC1 can be also obtained by counting the Vernier signal Sv21. The relative displacement INC2 can be also obtained by counting the Vernier signal Sv21'.

Next, the processing unit 60 obtains the absolute positions ABS11 and ABS21 in step S202, and obtains the absolute position $ABS_{OUT}$ of the scale 2 by using these absolute positions ABS11 and ABS21 in step S203. In step S204, the processing unit 60 outputs data of the absolute position $ABS_{OUT}$ to the control apparatus 300.

The absolute position ABS11 is calculated by the following formula (19) by using ABS10 and INC1.

$$ABS11 = ABS10 + INC1 \tag{19}$$

Similarly, the absolute position ABS21 is calculated by the following formula (20) by using ABS20 and INC2.

$$ABS21 = ABS20 + INC2 \tag{20}$$

The absolute position $ABS_{OUT}$ to be output to the control apparatus 300 is calculated by using the following formula (21).

$$ABS_{OUT} = (ABS11 + ABS21)/2 \tag{21}$$

As described above, the processing unit 60 detects the absolute position $ABS_{OUT}$ on the basis of the output signals $S_1$ and $S_2$ obtained from the pair of detection units $7_1$ and $7_2$, and outputs a signal indicating the absolute position $ABS_{OUT}$ to the control apparatus 300.

To be noted, although a case where the rotary encoder 260 includes the pair of detection units $7_1$ and $7_2$ has been described, the calculation of the formula (21) does not have to be performed in the case where the rotary encoder 260 includes only the detection unit $7_1$ as the detection unit of the rotary encoder 260. In this case, the absolute position $ABS_{OUT}$ output to the control apparatus 300 is the absolute position ABS11.

As described above, according to the present exemplary embodiment, even in the case where the eccentricity amount M1 of the scale 2 is larger than the threshold value TH, the deviation $\Delta\theta$ is not superimposed, and the absolute position $ABS_{OUT}$ of the scale 2 can be detected with high precision.

Incidentally, the robot arm 201 including the rotary encoder 260 is introduced into a manufacturing line in a factory or the like. Sometimes an external force or an overload is applied to the robot arm 201 as a result of, for example, the robot arm 201 hitting a member constituting the manufacturing line or hitting an adjacent robot arm. In addition, when the robot arm 201 is used for many years, parts such as bearings deteriorate. In the case where the eccentricity amount of the scale 2 exceeds the allowable limit due to these factors, an alert is issued.

The control apparatus 300 displays, on the display apparatus 600, in which of the joints J1 to J6 the eccentricity amount has exceeded the allowable limit, and further data indicating the eccentricity amount thereof together with an alert image. The operator can recognize the eccentricity amount of the scale 2 derived from change over time of the robot arm 201 by, for example, looking at the display apparatus 600.

Even in the case where the operator has recognized the eccentricity amount of the scale 2 and determined that maintenance has to be performed, the use of the robot arm 201 can be continued until, for example, the manufacturing line is stopped for regular maintenance. As a result of this, the manufacturing line is not stopped immediately, and therefore the productivity of the manufacturing line for the product is not lowered. Operations such as readjustment of the robot arm 201 or replacement of parts of the robot arm 201 may be performed during the regular maintenance.

In addition, also in the case where the rotary encoder 260 is incorporated in the joints J1 to J6 of the robot arm 201 with low precision, the angles of the joints J1 to J6 can be detected with high precision. Therefore, costs for assembly of the robot arm 201 can be reduced greatly.

To be noted, the present invention is not limited to the exemplary embodiment described above, and can be modified in many ways within the technical concept of the present invention. In addition, the effects described in the exemplary embodiment are merely enumeration of the most preferable effects that can be achieved by the present invention, and the effects of the present invention are not limited to those described in the exemplary embodiment.

Although a case where the number of periodic patterns included in the pattern 40 of the scale 2 is 2 has been described in the exemplary embodiment described above, the number is not limited to this. In addition, although a case where the pattern elements constituting the periodic patterns are formed to extend radially outwardly with respect to the center line C1 of the scale 2 has been described, the shape is not limited to this.

Further, although a case where an absolute rotary encoder of a Vernier system has been described, the configuration is not limited to this. For example, the rotary encoder may include a scale of a gray code, a binary-coded decimal code: BCD code, or an M-series pattern. In this case, it is sufficient if the scale includes at least one periodic pattern for a detection unit to generate an incremental signal.

In addition, although a case where a standard position is determined and the absolute position is obtained from a relative displacement from the standard position even when the eccentricity amount of the scale 2 is equal to or smaller than a threshold value has been described in the exemplary embodiment above, the configuration is not limited to this. For example, in the case where the eccentricity amount of the scale 2 is equal to or smaller than the threshold value, the absolute position may be obtained each time on the basis of the Vernier signal similarly to the case of obtaining the standard position, even though processing load on the processing unit is higher in this case. Then, the absolute position may be obtained by the method of the exemplary embodiment described above when the eccentricity amount of the scale 2 exceeds the threshold value.

In addition, although a case where the driving mechanism 230 is constituted by serially connecting the motor 231 and the reduction gear 234 has been described in the exemplary embodiment above, the configuration is not limited to this. For example, the driving mechanism may include a transmission mechanism such as a belt mechanism provided between the motor and the reduction gear.

In addition, although a case where the robot arm 201 is a vertically articulated robot arm has been described in the exemplary embodiment above, the configuration is not limited to this. For example, various robot arms such as horizontally articulated robot arms, parallel link robot aims, and orthogonal robots may be used as the robot arm.

In addition, although a position detection method using the rotary encoder 260 disposed between a pair of links has been described in the exemplary embodiment above, the configuration is not limited to this. A similar position detection method may be applied to the rotary encoder 250 disposed on the motor 231.

In addition, although a robot apparatus has been described as an example of a driving apparatus in the exemplary embodiment above, the configuration is not limited to this. The driving apparatus may be an apparatus that includes a driving mechanism and is different from a robot apparatus, for example, may be an image pickup apparatus. For example, the image pickup apparatus may be a surveillance camera having rotation driving mechanisms in the horizontal direction, that is, the pan direction, and in the vertical direction, that is, the tilt direction. The present invention may be applied to an absolute rotary encoder that detects the rotation angle of a lens barrel included in the surveillance camera.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-146511, filed Aug. 8, 2019, which is hereby incorporated by reference herein in its entirety.

What is claimed is:

1. An encoder apparatus comprising:
   a detection unit;
   a scale disposed to oppose the detection unit and rotatable with respect to the detection unit; and
   a processor configured to process an output signal output from the detection unit to obtain a relative position of the scale with respect to a standard position and thus detect an absolute position of the scale,
   wherein the processor is configured to execute a setting process of setting, as the standard position, a position where a deviation amount of the scale in a predetermined radial direction extending from a rotation axis of the scale is equal to or smaller than a threshold deviation value, the deviation amount changing in accordance with relative rotation of the scale with respect to the axis of rotation of the scale, and
   wherein the processor is configured to set the standard position in the setting process after the scale rotated from a position where the deviation amount is larger than the threshold value to a position where the deviation amount is equal to or smaller than the threshold value.

2. The encoder apparatus according to claim 1,
   wherein the scale comprises a periodic pattern,
   wherein the output signal output from the detection unit comprises a detection signal corresponding to detection of the periodic pattern, and
   wherein the processor obtains a relative displacement of the scale by processing the detection signal.

3. The encoder apparatus according to claim 1,
   wherein the scale comprises a first periodic pattern and a second periodic pattern having different periodicity from each other,
   wherein the output signal output from the detection unit comprises a first detection signal corresponding to detection of the first periodic pattern and a second detection signal corresponding to the second periodic pattern, and
   wherein the processor obtains a relative displacement of the scale by processing the first detection signal or the second detection signal.

4. The encoder apparatus according to claim 3, wherein, in the setting process, the processor generates a Vernier signal by processing the first detection signal and the second detection signal, and sets the standard position by using the Vernier signal.

5. The encoder apparatus according to claim 1,
   wherein the detection unit is a first detection unit, and
   wherein the encoder apparatus further comprises a second detection unit disposed such that the rotation axis is interposed between the first detection unit and the second detection unit.

6. The encoder apparatus according to claim 5, wherein the processor obtains the deviation amount on a basis of the output signal obtained from the first detection unit and an output signal obtained from the second detection unit.

7. A driving apparatus comprising:
   a first member;
   a second member;
   a driving mechanism configured to rotationally drive the second member with respect to the first member;
   the encoder apparatus according to claim 1; and
   a controller configured to control the driving mechanism,
   wherein the detection unit is provided on one of the first member and the second member,
   wherein the scale is provided on another of the first member and the second member, and
   wherein the controller controls the driving mechanism to rotate the second member with respect to the first member such that the deviation amount becomes from a value larger than the threshold value to a value equal to or smaller than the threshold value.

8. A robot apparatus comprising:
   a first link;
   a second link;
   a driving mechanism configured to rotationally drive the second link with respect to the first link;
   the encoder apparatus according to claim 1; and
   a controller configured to control the driving mechanism,
   wherein the detection unit is provided on one of the first link and the second link,
   wherein the scale is provided on another of the first link and the second link, and
   wherein the controller controls the driving mechanism to rotate the second link with respect to the first link such that the deviation amount becomes from a value larger than the threshold value to a value equal to or smaller than the threshold value.

9. The robot apparatus according to claim 8, further comprising:
   a warning portion configured to issue a warning,
   wherein, in the case where the deviation amount is larger than the threshold value, the controller controls the warning portion to issue a warning.

10. A position detection method for obtaining an absolute position of a scale that is disposed to oppose a detection unit, is rotatable with respect to the detection unit, and is configured to obtain an output signal output from the detection unit, the position detection method comprising:
   performing a setting process of setting, as a standard position for detecting the absolute position of the scale, a position where a deviation amount of the scale in a predetermined radial direction extending from a rotation axis of the scale is equal to or smaller than a threshold deviation value, the deviation amount changing in accordance with rotation of the scale with respect to the axis of rotation of the scale, after the scale rotated from a position where the deviation amount is larger than the threshold value to a position where the deviation amount is equal to or smaller than the threshold value; and obtaining the absolute position of the scale by processing the obtained output signal and thus obtaining a relative displacement of the scale with respect to the standard position.

11. A manufacturing method for a product, the manufacturing method comprising:

providing a robot arm comprising a joint provided with the scale and the detection unit; and manufacturing the product by operating the robot arm on a basis of information of the absolute position of the scale obtained by the position detection method according to claim 10.

12. A non-transitory computer-readable recording medium storing a program for causing a computer to execute the position detection method according to claim 10.

* * * * *